United States Patent Office 3,544,280
Patented Dec. 1, 1970

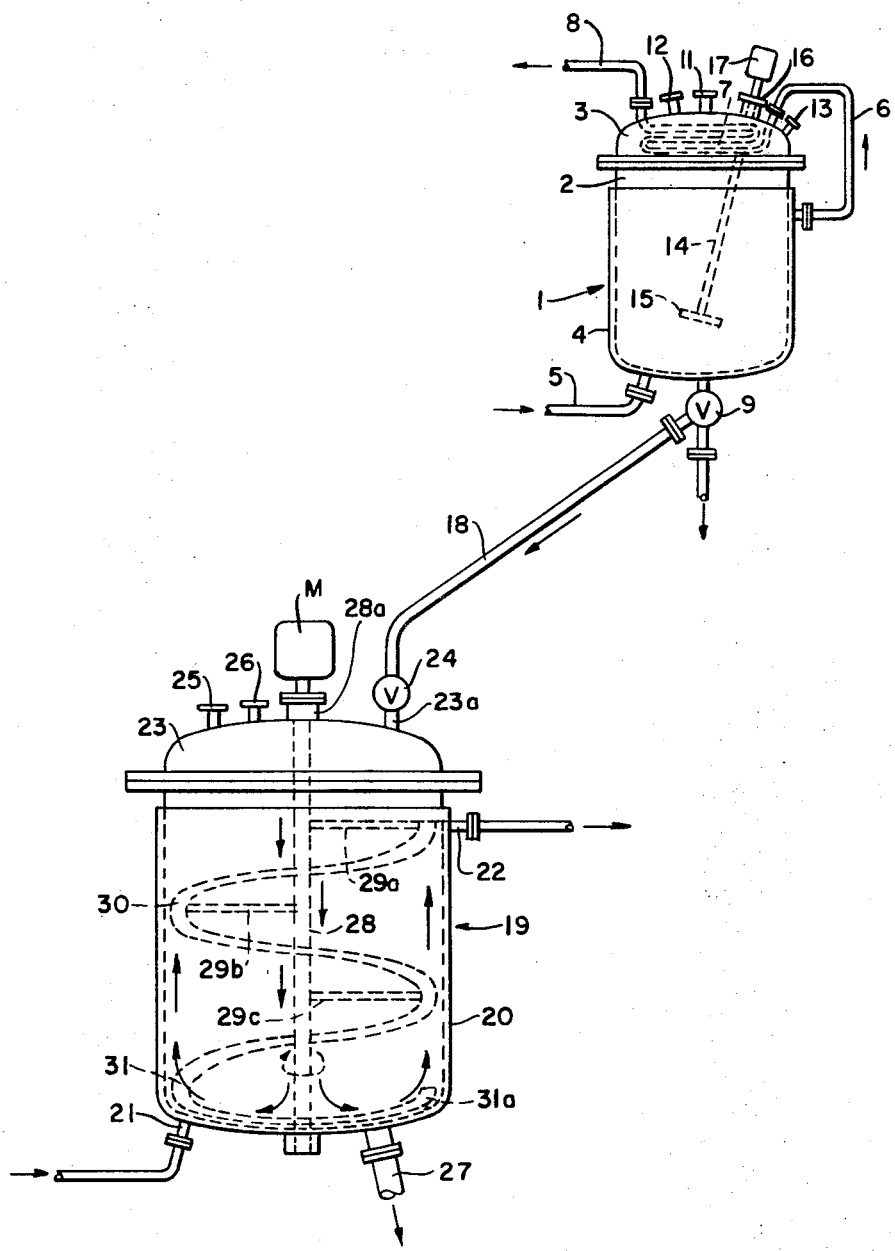

3,544,280
APPARATUS FOR THE PREPARATION IN MASS
OF VINYL CHLORIDE POLYMERS
Jean Claude Thomas, Lyon, Rhone, France, assignor to Produits Chimiques Pechiney-Saint-Gobain, Paris, France
Continuation-in-part of application Ser. No. 347,147, Feb. 25, 1964. Division of application Ser. No. 414,697, Nov. 30, 1964. This application May 3, 1968, Ser. No. 726,335
Claims priority, application France, Apr. 30, 1964, 972,927
Int. Cl. B01j 3/00
U.S. Cl. 23—290        6 Claims

ABSTRACT OF THE DISCLOSURE

An apparatus for polymerizing vinyl chloride and the like is provided with parts providing (a) efficient, smooth circulation of the mass in (b) intimate uniform contact with the temperature-controlled walls of the autoclave, (c) thereby promoting by walls which are automatically maintained clean and free of accretions and encrustations; and (d) maintaining the individual grains essentially separated and discrete so that all are subjected to the same rate of circulation and heat exchange. The apparatus is of autoclave type suitable for polymerizations in mass.

---

This application is a division of application Ser. No. 414,697, filed Nov. 30, 1964, and is directed to the apparatus for performing the method to which the claims of the parent application are directed.

In an earlier and now abandoned application Ser. No. 347,147 of which the present application is a continuation-in-part, I have described a method of preparing polymers and copolymers or vinyl chloride in mass, that is to say, in the absence of solvents and diluents, by polymerizing in a plurality of steps. In a first step the monomer is polymerized with high speed agitation until about 7 to 15% polymerization has been attained. Thereafter the polymerization is continued and concluded with relatively mild or slower speed agitation which, however, produces good thermal control of the reaction mass. The use of a prepolymerizer autoclave equipped with a high speed agitator such as one of the turbine type, followed by the use of one or more horizontal autoclaves equipped with relatively slow speed agitators of the ribbon blender type, is also described. A further disclosure is made of a pre-polymerizer coupled to one or more rotary horizontal autoclaves, the former including high speed agitation and the latter acting by rolling means to generate agitation of the mass. The aforesaid earlier application also discloses a prepolymerizer equipped with a high speed agitator connected to a stationary autoclave employing long, blade-type stirrers operating at relatively slow speed throughout the length of the autoclave and operating near the wall thereof. Finally, there is disclosed a prepolymerizer equipped with high speed type agitation, connected to a stationary horizontal autoclave equipped with short agitation blades working slowly near the wall of the autoclave, and others acting nearer the axis of rotation.

The present invention is a perfection of and an improvement over the apparatuses described and claimed in the aforesaid earlier application.

Application Ser. No. 414,697 aforesaid, of which the present application is a division, discloses a process and apparatus for carrying the process into practice, wherein the second stage of polymerization, that is the stage conducted at relatively slow rate or speed, is carried out in mass in a cylindrical autoclave having a vertical axis of rotation and equipped with blades helically disposed about the axis and operating at relatively slow speed near the wall of the apparatus. In its preferred form a vertical shaft extends in and along the central vertical axis of the autoclave tank and has affixed thereto, blades which extend helically about such axis, and which are so disposed as to operate closely adjacent the walls of the tank. The tank is water-jacketed for temperature control. The shaft and its attached blades are constructed, arranged and rotated at a rate which affords excellent control of the reaction by circulating and recirculating the reactive mass smoothly and uniformly, vertically and in contiguous relation to the temperature-controlled walls of the apparatus, while continuous return movement takes place in and along the central part of the apparatus, adjacent the rotating shaft.

In the preferred operation the helical blade or blades are rotated in a direction to impart an ascending movement to that portion of the mass adjacent to and in contact with the walls of the autoclave. The movement of the blades assures a regular and systematic circulation by which the mass in a flowable but essentially solid state, is raised from that portion thereof continuously collecting at the bottom of the tank, passed regularly and uniformly in contact with the cooled walls, moves radially inwardly from all directions, at and adjacent the top of the tank, and falls by gravity to the bottom for eventual recirculation. The grains of polymer are essentially separated each from the others and traverse a path which is the same for each grain. Each grain is thus under complete and accurate temperature control and as a result the final product is of maximum desired uniformity and grain size.

Since the helical blades operate at all times closely adjacent to the walls of the tank, they inherently operate to maintain these walls clean and free of accumulations and encrustations, thereby promoting a very even and uniform rate of heat transfer over the entire effective area of the water-jacketed portion of the tank, and assuring a high efficiency of operation and the maximum rate of production for any given capacity of apparatus.

A further advantage is a materially reduced rate of power consumption per unit mass of completed polymer. This is due to the fact that the blades are not required to continuously force their way through a mass compacted at the bottom of the tank, as they must do in a tank which is horizontal. In the present invention the larger portion of the mass is continuously under accretion as it falls freely at and along the central axis or shaft of the apparatus. This accreted mass continuously spreads radially outwardly in all directions, to replace material being picked up and elevated by the lower portion of the helical blade or blades. Since this central accreted mass at the bottom of the tank is moved outwardly by a gravity component force and is not traversed by the blade, the power required to rotate the blade at any given speed, is greatly reduced.

The blade may be in segments rather than continuous. That is, each helical segment may be of relatively short length and fixed to the shaft independently of the others. It is also possible to use a plurality of helical agitators near the wall, and helical agitators or helical segments of short radius operating near the shaft to control and maintain the rate of downflow.

The speeds of the helical agitators required by the main autoclave, that is, the one in which the second stage is performed, are lower, for instance one-tenth to one-twentieth of the speeds required by prior art types and processes of polymerization. This results in an additional saving of power and a more uniform and satisfactory product. For example, whereas a prior art autoclave of 2 cubic meters capacity required a rotational speed of 75 r.p.m., for prior art processes, the present invention requires a speed of but 3 to 10 r.p.m.

Among the chief objects of the invention are, therefore, to provide:

(1) An apparatus which enables the effective, efficient carrying out of the novel and improved process covered by the claims of the parent application;

(2) An apparatus which enables an improved product of polymer by (a) efficient, smooth circulation of the mass in (b) intimate uniform contact with the temperature-controlled walls of the autoclave, (c) promoted by walls which are automatically maintained clean and free of accretions and encrustations; and (d) maintaining the individual grains essentially separated and discrete so that all are subjected to the same rate of circulation and heat exchange;

(3) An apparatus which improves the granulometry and other desirable characteristics of the final product;

(4) An apparatus which effects large savings in power per unit mass of final product; and (5) An apparatus which because of the lower speeds required, is longer-lived and less expensive to build and maintain, for any given rate of production.

The foregoing and other objects and advantages of the present invention will more fully appear from the following description of the apparatus, when read in connection with the accompanying drawing. It is to be expressly understood however, that the drawing is for the purpose of illustration only and is not intended as a definition of the limits of the invention, reference for this latter purpose being had primarily to the appended claims.

The single figure of the drawing is a vertical elevational view, partly in phantom, of a preferred type of apparatus.

Referring in detail to the drawing, a cylindrical prepolymerizer autoclave 1 with essentially hemi-spherical bottom, has a pot 2 in which the initial stage of reaction occurs. A temperature controlling water jacket 4 encloses the side and bottom of the pot, and a discharge valve 9 which passes through the pot, affords exit for the prepolymerized mass. A cover 3 is provided with inlet ports 11, 12 which are equipped with control valves, not shown, for the admission of monomer and an atmosphere of nitrogen, respectively. A port 13, similarly valved, is connected to a source of vacuum. A tight fitting 16 supports the motor 17 of a high speed impeller 15 within the pot and the shaft of which passes through the fitting. A flexible hose 6 connects a cooling coil 7 within cover 3, to the water jacket 4. Liquid is supplied to the jacket through conduit 5 and exhausted by way of conduit 8. It will be understood that the water entering at conduit 5 is maintained at whatever temperature is required for optimum operation of whatever process is going on in the apparatus. The apparatus is particularly useful in the preparation of polyvinyl chloride and the following description will be directed to that subject.

A conduit 18 connects the prepolymerizer through valve 24, to the main autoclave 19 which has a discharge port 27 in an essentially hemi-spherical bottom. A water jacket 20 encloses the bottom of the tank and extends to practically the full height thereof. Ports 21, 22 provides for the flow of temperature-controlling fluid to and from the jacket, respectively. Port 27 is of large size so as to provide free discharge of the product, and is sealed in any standard manner. Cover 23 of the autoclave is provided with inlet port 23a for the partly polymerized product from autoclave 1, a gas release valve 25, a safety seal 26, and a tight mounting 28a for shaft 28 of helical impeller 30, 31 and segmental helical impeller 31a which operates close to the hemi-spherical bottom wall of the autoclave. The helical impeller blade 30 is supported from shaft 28 by rods 29a, 29b and 29c, and closely approaches the cylindrical wall. A motor M of low speed type, preferably equipped with reduction gearing, not shown, imparts low speed to the helical blades.

In the prepolymerizer a high speed stirrer 15 is employed, for instance one of the turbine type and of simple geometric form, or an agitator of the "bicone" type. The speeds used will be chosen as a function of the resin being prepared, its granulometry, and the type of agitator used. In producing polyvinyl chloride and its copolymers, in mass, speeds of 500 to 1500 r.p.m. have been found most useful without constituting equatorial limits. The prepolymerizer is provided with the usual instruments of control such as pressure gage, thermometer, and safety instruments which are not shown. The helical stirrer can be provided, if desired, with scrapers operating against the wall. Or its edge may be spaced from the wall. It may be made of blue steel or of plastic on a metal core.

In operating the apparatus, all valves are opened for the flow of nitrogen gas, which sweeps the air out of both autoclaves and the connecting pipe 18, or preferably a small quantity of vinyl chloride can be used for the same purpose, that is, for scavenging. Valve 9 is then closed, the prepolymerizer is charged with the quantity of monomer to be prepolymerized, for instance vinyl chloride under sufficient pressure to be liquid. The temperature of the jacket is established by the flow of water at selected temperature and the impeller is started at high speed.

Polymerization is carried on at high speed of agitation to the desired but incomplete point, for instance 10%. Valve 9 is then opened and the contents are discharged into the main autoclave where the polymerization is continued with low speed agitation to completion, that is to say, to the chosen end point. This may be about 70% after which gases are released as in ordinary practice, vacuum is applied to recover monomer from the granular mass of polymer, a nitrogen atmosphere sweeps out and scavenges the apparatus, and the polymerized mass or product is discharged through port 27.

In preferred operation the material being polymerized is moved vertically in contact with the jacketed wall of the autoclave tank. By proper selection of rotational speed of the helical blade, and by the use of helices of different or selected pitch, it is possible to attain a perfection of control that is impossible in prior art procedures. In general, low pitch of the helix and slow rotation thereof are both advantageous. For example, a vertical cylindrical autoclave having a volume of 2 m.³, an exterior diameter of 122 cm., a helical pitch of 103 cm., and a total height of the helix equal to 1½ times the pitch plus 25 cm. for a total height of 179.5 cm., lifted the peripheral portion of the mass under polymerization up the wall, about one meter per turn of the helix. In fact, the apparatus is so flexible and controllable that the rate of heat exchange with the jacket is not critical. Under any rational system of operation, the degradation of the polymer by local heating is prevented, perfection of intermixing takes place, and uniformity of product results.

The following examples illustrate the invention without detracting from the generality of what is elsewhere herein stated.

EXAMPLE 1

This example is for comparison; it follows a standard technique of the prior art.

A stationary vertical autoclave 2 m.³ capacity having a helical blade type agitator of stainless steel shaped as in the drawing, received 800 kg. of vinyl chloride after scavenging by 80 kg. of vinyl chloride. As catalyst, the mass received 128 g. (.016%) of azodiisobutyronitrile (ADBN) catalyst. Agitation was at a typical speed of 75 r.p.m. The temperature rose rapidly to 62° C. and a relative pressure of 9.5 kg./cm.². Polymerization to the chosen end point was completed after 14 hours, 30 minutes, the autoclave was blown and a 65% yield was obtained of a polymer powder having the Fikentscher K of 62. Its apparent density was .350 and its granulometric distribution (granulometry) was as follows, the lower line of the table being the percent fallthrough.

TABLE I

| Screen apertures in m$\mu$: | Percent fallthrough |
|---|---|
| 630 | 96 |
| 500 | 94 |
| 400 | 93 |
| 315 | 90 |
| 250 | 79 |
| 200 | 39 |
| 160 | 17 |
| 100 | 6 |

The grain sizes were widely distributed.

EXAMPLE 2

A vertical autoclave of 1,000 liters in stainless steel, provided with a turbine agitator 300 mm. in diameter arranged as in the drawing and rotated during the prepolymerization at 720 r.p.m., received 800 kg. of vinyl chloride and 144 g. of ADBN (.018% of the weight of the monomer). 80 kg. of vinyl chloride monomer was used to scavenge the autoclave. The temperature of the reaction rose rapidly to 62° C. and a pressure of 9.5 kg./cm.$^2$.

After 2 hours of polymerization the mixture of monomer and polymer was flowed to a vertical autoclave of the type described in Example 1, which had been scavenged in like manner. The transfer took 1 minute. The helical agitator was rotated at 10 r.p.m. and the conditions were maintained at 62° C. and 9.5 kg./cm.$^2$. Polymerization continued 13 hours, making a total time of 15 hours.

On discharge there was a yield of 70.8% compared to the 65% of Example 1, of a powder having $K=62$, apparent density 0.52, compared to the 0.35 of Example 1, and the following granulometry:

TABLE II

| Screen sizes (m$\mu$): | Percent fallthrough |
|---|---|
| 630 | 99 |
| 500 | 98 |
| 400 | 98 |
| 315 | 98 |
| 250 | 97 |
| 200 | 93 |
| 160 | 90 |
| 100 | 1 |

The granulometry was concentrated in fewer sizes, the majority of particles being of sizes above 100 m$\mu$ and below 160 m$\mu$.

A similar test was carried out using a speed of 5 r.p.m. for the helix, producing a polymer of equal quality.

EXAMPLE 3

This example shows the results of a prior art process of copolymerization:

The autoclave of Example 1 was scavenged and received 752 kg. of vinyl chloride, 48 kg. of vinyl acetate, and 168 g. (.021% by weight) of ADBN. The speed of the helix was 75 r.p.m., the temperature of the reaction 60° C., and the pressure 9 kg./cm.$^2$. Polymerization proceeded for 12 hours, 15 minutes. The yield was 69.8% of a copolymer of apparent density 0.5 having the following distribution of sizes:

TABLE III

| Screen size (m$\mu$): | Percent fallthrough |
|---|---|
| 630 | 96 |
| 500 | 90 |
| 400 | 88 |
| 315 | 80 |
| 250 | 70 |
| 200 | 35 |
| 160 | 18 |
| 100 | 12 |

The granulometry, size distribution, was widely distributed.

EXAMPLE 4

A similar copolymerization was carried out according to this invention:

The prepolymerizer of Example 2 was scavenged and received 752 kg. of vinyl chloride, 48 kg. of vinyl acetate, and 184 g. (.023% by weight) of ADBN. The agitator ran at 730 r.p.m., the temperature was 60° C. and the pressure 9 kg./cm.$^2$. After 2 hours, 30 minutes of polymerization the mixture was transferred to the main autoclave of Example 2, which had been scavenged. The transfer took one minute. The helical agitator was rotated at 10 r.p.m., the temperature was 60° C. and the pressure 9 kg./cm.$^2$. Polymerization in the main autoclave took 10 hours, 30 minutes, for a total of 13 hours. After discharge the yield was 71.2% compared to the 69.8% of Example 3, and the apparent density was 0.65 compared to the 0.5 of the product of Example 3. The granulometry was as follows:

TABLE IV

| Screen size (m$\mu$): | Percent fallthrough |
|---|---|
| 630 | 98 |
| 500 | 97 |
| 400 | 95 |
| 315 | 94 |
| 250 | 92 |
| 200 | 88 |
| 160 | 60 |
| 100 | 1 |

The grains were more concentrated in fewer sizes, 60% of all particles being between 100 and 160 m$\mu$, and 88% of them were smaller than 200 m$\mu$.

Another test was carried out under like conditions using a speed of 5 r.p.m., with similarly improved results compared to the prior art.

Some of the advantages of the invention have been set forth above. Others are that the two step process of application Ser. No. 414,697, using prepolymerization with high speed agitation and completion of polymerization at low speed while moving the periphery of the mass upwardly along the wall by a helical blade agitator, produces high density resins, more concentrated grain sizes, and sizes of grains which can be controlled by the conditions in the autoclave, particularly the speed of agitation in the prepolymerizer. The new process reduces power consumption compared to that required in the prior art, single operation method.

The present invention keeps the main autoclave walls clean, by eliminating the projection of particles against it and the gradual formation of crusts. It also maintains more uniform conditions especially by establishing constant and uniform displacement of the material in contact with the wall, and more uniform subjection of all grains of the mass to the same conditions of treatment.

The present invention permits better use of the full capacity of the apparatus during polymerization, and better conditions of filling and discharge. A particular advantage of the apparatus is that the filling and security devices are all located in the cover and are, therefore, in a gaseous area of small volume, so that in case of automatic release of pressure there is almost no escape of polymer. Even when relief of pressure is very rapid, there is substantially no escape of polymer.

From the foregoing description it will appear that the invention relates particularly but not exclusively, to an apparatus by which polymers and copolymers of vinyl chloride may be prepared or produced, in a plurality of stages of which the first is carried only to about 7 to 15% of completion with high speed agitation, leaving a flowable polymerization mass readily transferred under pressure. The second stage is carried out with low speed agitation of toroidal type, the flow being preferably upward peripherally adjacent a heat exchanger wall and downwardly at the center. The prepolymerizer may employ many kinds of high speed agitation of which turbines and bicones are typical. But the main autoclave should be vertically cylindrical and equipped with a slow speed helical agitator working adjacent the wall. This establishes controlled flow, superior mixing, and a better product. The agitator may have continuous helical blades. Alternatively it may have blades forming segments of helices. There may be an inner helix, usually of different pitch, to control the axial flow of the mass. Both types, continuous and segmental may be used by attachment to a single rotary axial shaft.

As many apparently widely different embodiments of the present invention may be made without departing from the spirit and scope thereof, it is to be understood that the invention is not limited to the specific embodiments shown and described herein.

Having fully disclosed the invention, what I claim and desire to secure by Letters Patent is:

1. Apparatus for the preparation in mass of polymers and copolymers of vinyl chloride base, which comprises, a prepolymerizer autoclave having a first pot equipped with a heat exchanger, a cover for said first pot and having positioned therein a heat exchanger connected with the heat exchanger of said first pot, said cover being equipped with valved ports for the entry and discharge of gases, and for pressure control, and with a pressure-tight mounting for an impeller, high speed impeller means supported by said mounting and including a shaft extending into said first pot, an impeller on said shaft therewithin said mounting, shaft and impeller being thus supported by and removable as a unit with said cover, said prepolymerizer autoclave being in valved communication with at least one other autoclave for the polymerization of prepolymerized compositions introduced from said prepolymerizer, and including a cylindrical second pot having a vertical axis of symmetry and a heat exchanger jacket, a cover therefor having an inlet from said first pot and an outlet for a polymerizable flowable mass and the residual gases from polymerization, said second-named cover also having a safety seal and bearing means for an agitator, a slow speed helical agitator blade mounted by said bearing means in and coaxially with said second pot, said helical blade having impeller portions contiguous to both the bottom and side walls of said second pot, thus impelling material collecting on said bottom wall radially outwardly of said axis, then upwardly along and contiguous to said side walls.

2. A main autoclave for the polymerization in mass of monomer and comonomers of vinyl chloride base, comprising, a pressure tank having side wall cylindrical about a vertical axis of symmetry, a generally hemi-spherical bottom wall, and top wall detachably secured to the top edge of said side wall, a shaft journaled in said tank along and for rotation about said axis, power means connected with said shaft and operable to rotate the same at relatively slow speed, and agitator blade fixed to said shaft and extending helically thereabout, said blade extending from contiguous and essentially scraping relation with said bottom wall to said top edge, with its peripheral edge closely adjacent said side wall, a valved entrance opening in said top wall, a valved exit opening in said bottom wall, and a temperature control jacket surrounding and in heat exchange relation with said side and bottom walls, rotation of said agitator blade by said power means acting to impel material accumulating on said bottom wall, radially outwardly, then upwardly along and contiguous to said side wall.

3. The autoclave of claim 2, said blade terminating in a lower arcuate end extending circumferentially about said axis and closely adjacent the juncture between said side and bottom walls.

4. The autoclave of claim 2, said blade having a dimension in the direction of said axis, of about 1½ times the pitch of its helix.

5. The main autoclave of claim 2, in combination with a prepolymerizer autoclave comprising a pressure tank having side, bottom and top walls, a temperature control jacket surrounding said side and bottom walls, a mixer blade journaled in said tank for rotation about an axis fixed relatively thereto, power means connected with said mixer blade to spin the same at relatively high speed, conduit means connected with and extending through said top wall of said tank, to charge the same, and a valved conduit connecting the prepolymerizer to said pressure tank of the main autoclave and extending through the bottom wall of the prepolymerizer tank and the top wall of the main autoclave.

6. The apparatus of claim 5, said power means operating to drive the helical blade agitator of the main autoclave at a speed in r.p.m., about 1/15 of the speed at which power means operates the mixer blade of the prepolymerizer.

References Cited
UNITED STATES PATENTS

| | | | |
|---|---|---|---|
| 2,053,266 | 9/1936 | Curtis | 23—260 XR |
| 2,644,806 | 7/1953 | Kise | 23—260 XR |
| 2,931,793 | 4/1960 | Melchore | 260—95 XR |
| 3,049,413 | 8/1962 | Sifford | 23—285 |

JAMES H. TAYMAN, JR., Primary Examiner

U.S. Cl. X.R.

23—260, 263, 285; 165—94, 107, 109; 260—92.8, 93.5, 95, 96.